No. 873,241. PATENTED DEC. 10, 1907.
E. IMLE.
TURBINE WHEEL.
APPLICATION FILED JUNE 13, 1907.

Witnesses
F. Brashears
M. Brashears.

Inventor
Emil Imle
By Paul E. Schilling
Attorney

UNITED STATES PATENT OFFICE.

EMIL IMLE, OF WEISSER HIRSCH, NEAR DRESDEN, GERMANY.

TURBINE-WHEEL.

No. 873,241.   Specification of Letters Patent.   Patented Dec. 10, 1907.

Application filed June 13, 1907. Serial No. 378,847.

*To all whom it may concern:*

Be it known that I, EMIL IMLE, a subject of the German Emperor, residing at Weisser Hirsch, near Dresden, German Empire, have invented certain new and useful Improvements in Turbine-Wheels, of which the following is a specification.

The present invention relates to improvements in turbine wheels and relates more especially to means for securing the peripheral blades to the wheel body.

The manufacture of rapidly revolving turbine wheels for elastic fluid and liquid motive agents is a difficult operation, since the blades, especially in gas and steam turbines are rather small and must be reliably secured in large numbers on the wheel proper, in order to prevent them from being torn loose by the great centrifugal strain they are subjected to.

According to my invention I weld the blades so intimately with the wheel body, that the parts practically form an integral body, so that there is no danger of the blades flying off. Besides this, my improved construction of wheel is relatively cheap and easy of manufacture.

Figure 1:
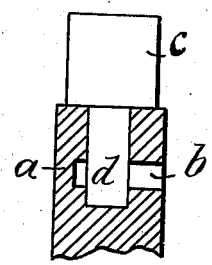
Figure 2:
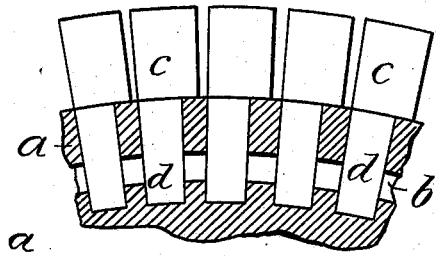
Figure 3:
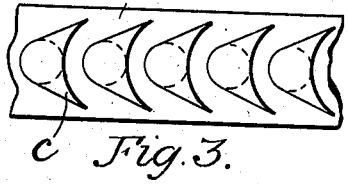
Figure 4:
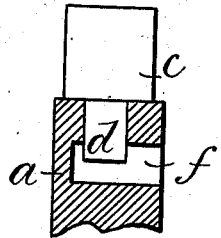
Figure 5:
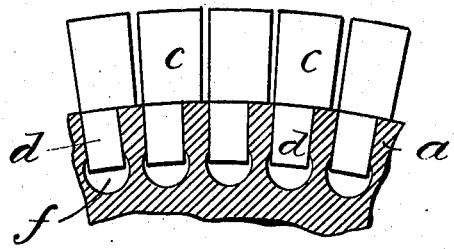
Figure 6:
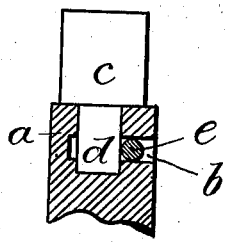
Figure 7:
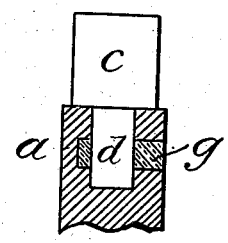

In order to make the invention more readily understood, I will now describe it with reference to the accompanying drawing, in which Figure 1 shows a section through the wheel rim on a radial plane, a blade being shown in rear elevation. Fig. 2 is a section on a plane at right angles to that of Fig. 1, the blades shown in side elevation. Fig. 3 is a plan view of part of a wheel and five blades. Figs. 4 and 5 are views, similar to Fig. 1 and Fig. 2, of a modification. Fig. 6 is a view similar to Fig. 1, with a wire inserted in the annular groove before welding. Fig. 7 is a similar view with the annular groove filled with solder or like metal before welding.

Referring to Figs. 1 and 2, the wheel body or rim $a$ is provided on one side near the periphery with an annular concentric groove $b$. The blades $c$ which are of crescent shape in cross section, as shown in Fig. 3, but may be of other suitable cross-section and form, are provided with feet, $d$, which are inserted in bores sunk radially into the wheel, passing across the groove $b$ and a short distance beyond into the wheel body. The parts are then welded together.

In the modification illustrated in Figs. 4 and 5, there are provided, instead of the annular groove $b$, separate lateral bores $f$ for each blade foot $d$, extending inwardly from the side face of the wheel rim or body and communicating with the radial bores which receive the blade feet $d$. When the feet are inserted in the radial bores they project into their corresponding lateral bores $f$.

In the modification shown in Fig. 6 a wire $e$ is inserted in and partially fills the groove $b$ prior to welding and is welded together with the other parts.

In Fig. 7, I have illustrated how the annular groove $b$ may be filled with melted metal such for instance as a very hard solder as at $g$, which during the operation of welding becomes thoroughly united to the other parts.

While any known method of welding may be used, I prefer the process known in Germany as "autogenous" welding, wherein the parts to be welded together are brought to welding heat or liquefaction by a suitable hydrocarbon or the like flame, or the electric arc, whereby if desired, a wire or solder may be used as in Figs. 6 and 7, to fill out any vacant spaces. This filling may be of the same, or approximately the same, material as the parts to be welded.

The welding is performed by directing the flame, (which needs not to be large, often a few millimeters being sufficient), to where the welding is to take place, that is in the present instance, into the groove $d$ or at the bores $e$. The blade feet and the wall of the wheel openings are thereby heated and fused. At the same time the filling, if used, is heated, so that it intimately combines with the other parts to form an integral body. The welding thus is purely local.

The adjacent parts are not affected by the welding flame, which, considering the delicacy of the small blades, is of great value.

It is not absolutely necessary to use a filling, as often the parts to be welded so fuse together, that they become integral.

What I claim is:—

1. A turbine wheel having a radial bore, and an opening communicating therewith, and blades provided with a foot inserted into said radial bore, the parts being welded together to form an integral body, substantially as set forth.

2. A turbine wheel having a radial bore and a lateral opening intersecting said radial bore, and a blade provided with a foot inserted into said radial bore, the parts being welded together to form an integral body, substantially as set forth.

3. A turbine wheel having a lateral annular groove and radial bores intersecting said groove, and blades provided with feet inserted into said radial bores and entering into the groove, the parts being welded together to form an integral body, substantially as set forth.

4. A turbine wheel having an annular groove in its side and radial bores in its periphery intersecting said groove, blades provided with feet inserted into said radial bores, and metal filling in said groove, the parts being welded together to form an integral body, substantially as set forth.

5. A turbine wheel having an annular groove in its side and radial bores in its periphery intersecting said groove, blades provided with feet inserted into said radial bores, and a wire in said groove, the parts being welded together to form an integral body, substantially as set forth.

In testimony, that I claim the foregoing as my invention, I have signed my name in presence of two subscribing witnesses.

EMIL IMLE.

Witnesses:
   ULYSSES J. BYWATER,
   CLÄRE SIMON.